(12) United States Patent
Ebnöther et al.

(10) Patent No.: US 10,710,328 B2
(45) Date of Patent: Jul. 14, 2020

(54) WHEELED TRAILER SANDWICH STRUCTURE INCLUDING GROOVED OUTER SHEET

(71) Applicant: CELLTECH METALS, INC., Oceanside, CA (US)

(72) Inventors: Fabien Ebnöther, Munich (DE); Douglas Cox, Oceanside, CA (US)

(73) Assignee: CellTech Metals, Inc., Searcy, AR (US)

( * ) Notice: Subject to any disclaimer, the term of this patent is extended or adjusted under 35 U.S.C. 154(b) by 0 days.

(21) Appl. No.: 16/158,435

(22) Filed: Oct. 12, 2018

(65) Prior Publication Data
US 2019/0039344 A1 Feb. 7, 2019

Related U.S. Application Data

(63) Continuation of application No. 15/303,958, filed as application No. PCT/US2015/026839 on Apr. 21, 2015, now Pat. No. 10,124,555.
(Continued)

(51) Int. Cl.
*B32B 3/28* (2006.01)
*B32B 3/30* (2006.01)
(Continued)

(52) U.S. Cl.
CPC .............. *B32B 3/28* (2013.01); *B32B 3/30* (2013.01); *B32B 7/03* (2019.01); *B32B 7/05* (2019.01); *B32B 7/08* (2013.01); *B32B 7/12* (2013.01); *B32B 7/14* (2013.01); *B32B 15/011* (2013.01); *B32B 15/016* (2013.01); *B32B 15/04* (2013.01); *B32B 15/043* (2013.01); *B32B 15/18* (2013.01); *B32B 15/20* (2013.01); *B65D 88/02* (2013.01);
(Continued)

(58) Field of Classification Search
None
See application file for complete search history.

(56) References Cited

U.S. PATENT DOCUMENTS

| 782,558 A | 2/1905 | Hahn |
|---|---|---|
| 2,087,010 A | 7/1937 | Wardle |

(Continued)

FOREIGN PATENT DOCUMENTS

| GB | 2182703 A | 5/1987 |
|---|---|---|
| WO | WO-2015/148707 A1 | 10/2015 |

OTHER PUBLICATIONS

Kim, Jang-Kyo, et al.; "Forming and failure behaviour of coated, laminated and sandwiched sheet metals: a review", *Journal of Materials Processing Technology*, 63, 1997, pp. 33-42.
(Continued)

*Primary Examiner* — Adam Krupicka
(74) *Attorney, Agent, or Firm* — Harness, Dickey & Pierce, PLC

(57) ABSTRACT

A sandwich structure employs a core sheet including alternating peaks and valleys therein, and at least one outer face sheet including grooves or ribs therein. In another aspect, a sandwich structure includes at least one core and at least one adhesively bonded outer face sheet including elongated grooves or ribs formed therein. Yet another aspect of a sandwich structure has raised ridges bridging between adjacent peaks in a core sheet in one direction but not in a perpendicular direction, which synergistically interface, engage or contact with grooves or ribs formed in an outer face sheet.

30 Claims, 7 Drawing Sheets

Related U.S. Application Data

(60) Provisional application No. 61/982,453, filed on Apr. 22, 2014.

(51) Int. Cl.

| | | |
|---|---|---|
| *B65D 88/02* | (2006.01) | |
| *B32B 15/04* | (2006.01) | |
| *B32B 15/01* | (2006.01) | |
| *B32B 15/20* | (2006.01) | |
| *B32B 15/18* | (2006.01) | |
| *B32B 7/14* | (2006.01) | |
| *B32B 7/12* | (2006.01) | |
| *B32B 7/08* | (2019.01) | |
| *B32B 7/03* | (2019.01) | |
| *B32B 7/05* | (2019.01) | |

(52) U.S. Cl.
CPC ....... *B32B 2250/40* (2013.01); *B32B 2255/06* (2013.01); *B32B 2255/26* (2013.01); *B32B 2307/542* (2013.01); *B32B 2419/00* (2013.01); *B32B 2419/04* (2013.01); *B32B 2439/00* (2013.01); *B32B 2439/62* (2013.01); *B32B 2605/00* (2013.01); *B32B 2605/08* (2013.01); *B32B 2607/00* (2013.01); *Y10T 428/1234* (2015.01); *Y10T 428/1241* (2015.01); *Y10T 428/12417* (2015.01); *Y10T 428/24669* (2015.01)

(56) References Cited

U.S. PATENT DOCUMENTS

| | | |
|---|---|---|
| 2,391,997 A | 1/1946 | Noble |
| 2,441,476 A | 5/1948 | Ewald |
| 2,481,046 A | 9/1949 | Scurlock |
| 2,605,064 A | 7/1952 | Davis |
| 2,738,297 A | 3/1956 | Pfisterhammer |
| 2,809,908 A | 10/1957 | French |
| 2,950,788 A | 8/1960 | Edgar |
| 3,013,641 A | 12/1961 | Compton |
| 3,071,853 A | 1/1963 | Price et al. |
| 3,086,899 A | 4/1963 | Smith |
| 3,151,712 A | 10/1964 | Jackson |
| 3,173,383 A | 3/1965 | Eggert |
| 3,217,845 A | 11/1965 | Reynolds |
| 3,227,598 A | 1/1966 | Robb |
| 3,432,859 A | 3/1969 | Jordan |
| 3,481,642 A | 12/1969 | Campbell |
| 3,525,663 A | 8/1970 | Hale |
| 3,597,891 A | 8/1971 | Martin |
| 3,742,663 A | 7/1973 | Duskin |
| 3,757,559 A | 9/1973 | Welsh |
| 3,834,487 A | 9/1974 | Hale |
| 3,865,679 A | 2/1975 | Hale |
| 3,876,492 A | 4/1975 | Schott |
| 3,914,486 A | 10/1975 | Borgford |
| 3,938,963 A | 2/1976 | Hale |
| 3,950,259 A | 4/1976 | Pallo et al. |
| 4,025,996 A | 5/1977 | Saveker |
| 4,044,186 A | 8/1977 | Stangeland |
| 4,049,855 A | 9/1977 | Cogan |
| 4,077,247 A | 3/1978 | Stewart |
| 4,275,663 A | 6/1981 | Sivachenko et al. |
| 4,344,995 A | 8/1982 | Hammer |
| 4,356,678 A | 11/1982 | Andrews et al. |
| 4,411,121 A | 10/1983 | Blacklin et al. |
| 4,635,992 A | 1/1987 | Hamilton et al. |
| 4,718,214 A | 1/1988 | Waggoner |
| 4,910,065 A | 3/1990 | McKinney |
| 5,030,488 A | 7/1991 | Sobolev |
| 5,195,580 A | 3/1993 | Hoeffken |
| 5,366,787 A | 11/1994 | Yasui et al. |
| 5,580,637 A | 12/1996 | Konta et al. |
| 5,678,715 A | 10/1997 | Sjostedt et al. |
| 5,791,118 A | 8/1998 | Jordan |
| 5,860,693 A | 1/1999 | Ehrlich |
| 5,887,402 A | 3/1999 | Ruggie et al. |
| 6,183,879 B1 | 2/2001 | Deeley |
| 6,220,651 B1 | 4/2001 | Ehrlich |
| 6,257,043 B1 | 7/2001 | Wiens |
| 6,412,854 B2 | 7/2002 | Ehrlich |
| 6,547,280 B1 | 4/2003 | Ashmead |
| 6,846,559 B2 | 1/2005 | Czaplicki et al. |
| 6,908,143 B2 | 6/2005 | Ashmead |
| 6,928,848 B2 | 8/2005 | Golovashchenko et al. |
| 6,939,599 B2 | 9/2005 | Clark |
| 6,959,959 B1 | 11/2005 | Roush |
| 7,010,897 B1 | 3/2006 | Kuppers |
| 7,025,408 B2 | 4/2006 | Jones et al. |
| 7,100,971 B2 | 9/2006 | Pines |
| 7,214,018 B2 | 5/2007 | Lussier |
| 7,267,393 B2 | 9/2007 | Booher |
| 7,401,844 B2 | 7/2008 | Lemmons |
| 7,527,325 B2 | 5/2009 | Yurgevich |
| 7,621,589 B1 | 11/2009 | Gerome |
| 7,648,058 B2 | 1/2010 | Straza |
| 7,752,729 B2 | 7/2010 | Faehrrolfes et al. |
| 7,753,254 B2 | 7/2010 | Straza |
| 7,757,931 B2 | 7/2010 | Straza |
| 7,798,447 B2 | 9/2010 | Frantz et al. |
| 7,927,708 B2 | 4/2011 | Mizrahi |
| 7,931,328 B2 | 4/2011 | Lewallen et al. |
| 8,016,152 B2 | 9/2011 | Roush et al. |
| 8,205,642 B2 | 6/2012 | Straza |
| 8,419,110 B2 | 4/2013 | Katz et al. |
| 8,426,010 B2 | 4/2013 | Stadthagen-Gonzalez |
| 8,434,472 B2 | 5/2013 | Hanson et al. |
| 8,506,221 B2 | 8/2013 | Pattison et al. |
| 8,540,099 B2 | 9/2013 | Roush |
| 8,580,061 B2 | 11/2013 | Cik |
| 8,835,016 B2 | 9/2014 | Ebnoether |
| 9,067,729 B2 | 6/2015 | Fenton |
| 9,764,780 B2 | 9/2017 | Zehner et al. |
| 9,884,660 B2 | 2/2018 | Fenton |
| 9,884,661 B2 | 2/2018 | Fenton |
| 9,925,736 B2 | 3/2018 | Cox et al. |
| 10,112,248 B2 | 10/2018 | Gould et al. |
| 10,124,555 B2 | 11/2018 | Ebnother et al. |
| 10,144,582 B2 | 12/2018 | Ebnother et al. |
| 2003/0080586 A1 | 5/2003 | Ehrlich |
| 2003/0210966 A1 | 11/2003 | Haire |
| 2005/0029708 A1 | 2/2005 | Coyle |
| 2005/0084703 A1 | 4/2005 | Ashmead |
| 2005/0230033 A1 | 10/2005 | Faehrrolfes et al. |
| 2007/0114269 A1 | 5/2007 | Straza |
| 2008/0292898 A1 | 11/2008 | Straza |
| 2009/0053548 A1 | 2/2009 | Straza |
| 2009/0159592 A1 | 6/2009 | Vitalis et al. |
| 2012/0234470 A1 | 9/2012 | Nishio et al. |
| 2012/0305217 A1 | 12/2012 | Cowburn et al. |
| 2013/0224419 A1 | 8/2013 | Lee et al. |
| 2013/0244006 A1 | 9/2013 | Ebnoether |
| 2013/0330521 A1 | 12/2013 | Ebnoether |
| 2015/0044494 A1 | 2/2015 | Ebnoether |
| 2015/0078804 A1 | 3/2015 | Ehrlich |
| 2015/0165724 A1 | 6/2015 | Cox et al. |
| 2017/0036415 A1 | 2/2017 | Ebnother et al. |
| 2017/0274465 A1 | 9/2017 | Gould et al. |
| 2017/0327310 A1 | 11/2017 | Ebnother et al. |
| 2018/0170449 A1 | 6/2018 | Cox et al. |
| 2018/0207902 A1 | 7/2018 | Cox et al. |

OTHER PUBLICATIONS

Van Straalen, Ijsbrand J.; "Comprehensive Overview of Theories for Sandwich Panels", *TNO Building and Construction Research*, 1998, pp. 48-70.

Stoffer, Harry; "Some suppliers see dollars in a higher CAFE", Automotive News, Crain Communications, Inc., Jul. 2, 2007, two pages.

Carey, John; "What's Next—Green Biz Materials of New Plastics and a Steel Sandwich", BusinessWeek, Oct. 22, 2007, one page.

(56) References Cited

OTHER PUBLICATIONS

" . . . Honeycomb Structure Holds Potential", Autotech Daily, Apr. 15, 2008, one page.
Vasilash, Gary S.; "From Small Things: Big Differences", Automotive Design and Production, Jun. 2008, one page.
"UltraSteel" brochure published by Hadley Group in Oct. 2010, 8 pages.
Ebnoether, Fabien, et al.; "Predicting ductile fracture of low carbon steel sheets: Stress-based versus mixed stress/strain-based Mohr-Coulomb model;" International Journal of Solids and Structures 50 (2013; published online Dec. 27, 2012); pp. 1055-1066.
Photos of Hyundai "EcoCell" trailer, containing doors including CellTech LLC's three sheet steel sandwich, shown at U.S. tradeshow in Mar. 2013.
"Whiting AirCell Availabity," Whiting airCell promotion, Sep. 26, 2013, three pages.
"airCELL—Innovative Panels for the Truck & Trailer Industries", Whiting, published before Dec. 4, 2013, one page.
"Meyer—Laminating machines for technical textiles, foams, nonwoven, foils, fabrics," http.//www.meyer-machines.com/engl/Products/Laminating/laminating.html, printed from internet, believed to have been published prior to Dec. 13, 2013, one page.
"airCELL the revolutionary all-steel sandwich panel that increases strength and reduces weight for trailer side walls and doors" Whiting, published prior to Nov. 2013, four pages.

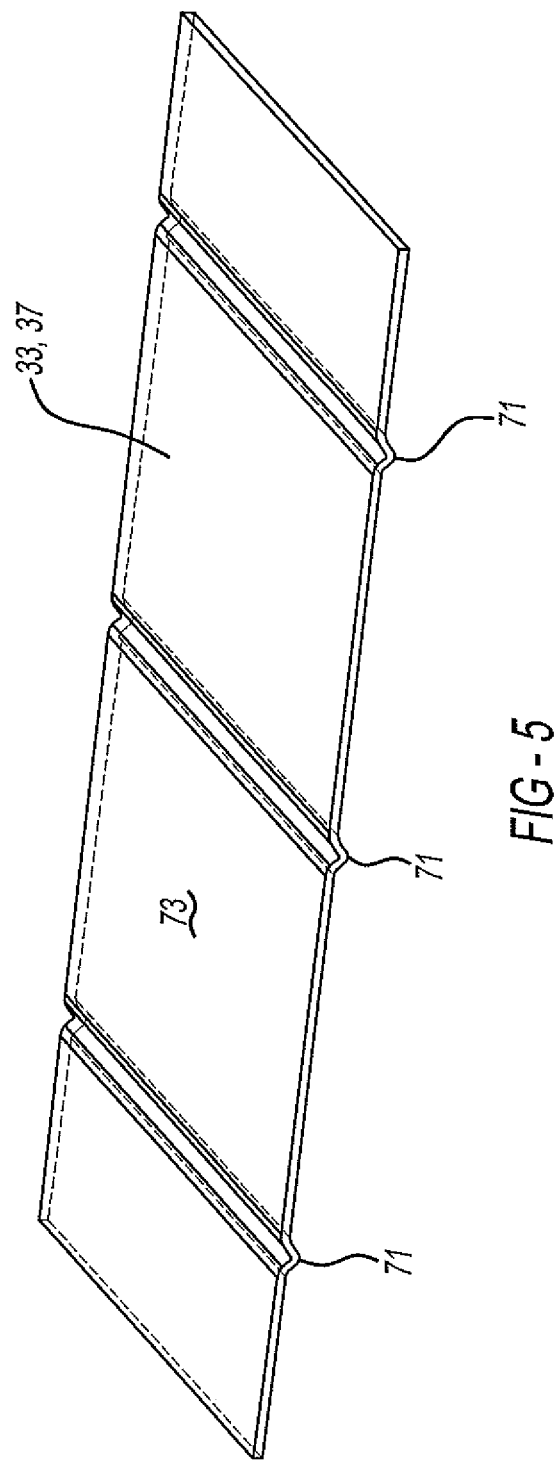

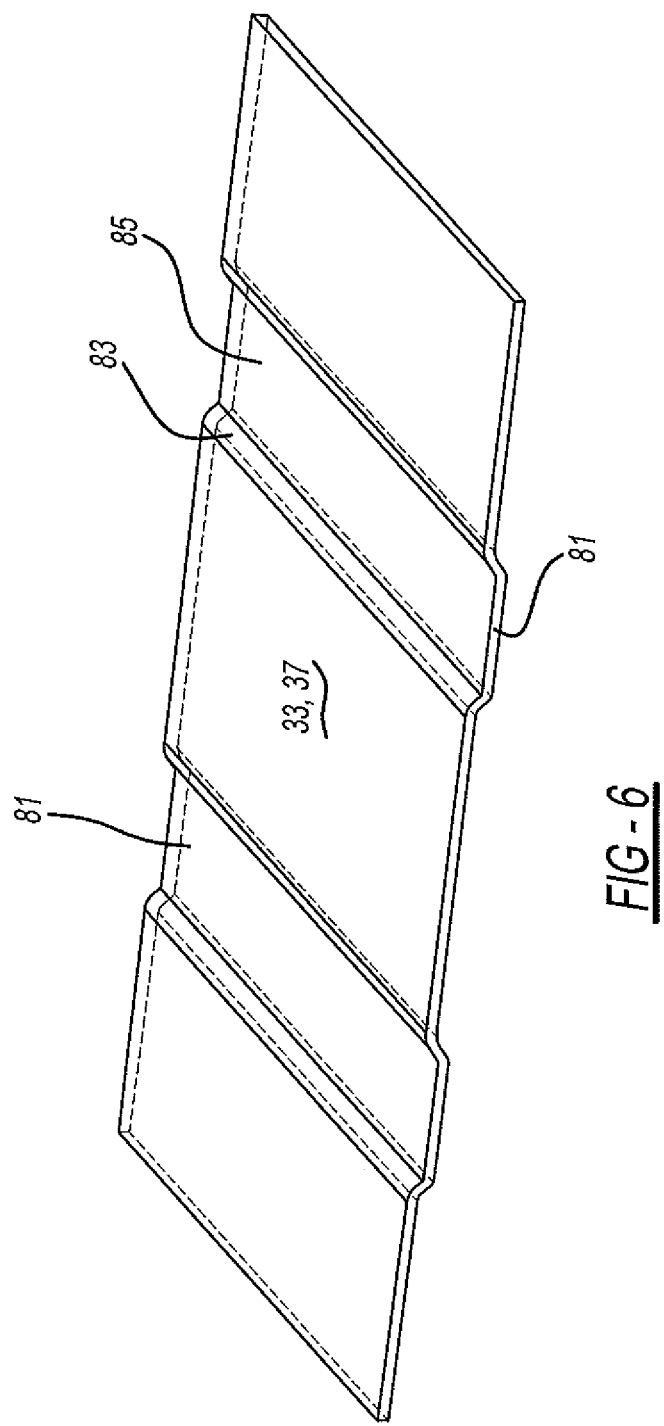

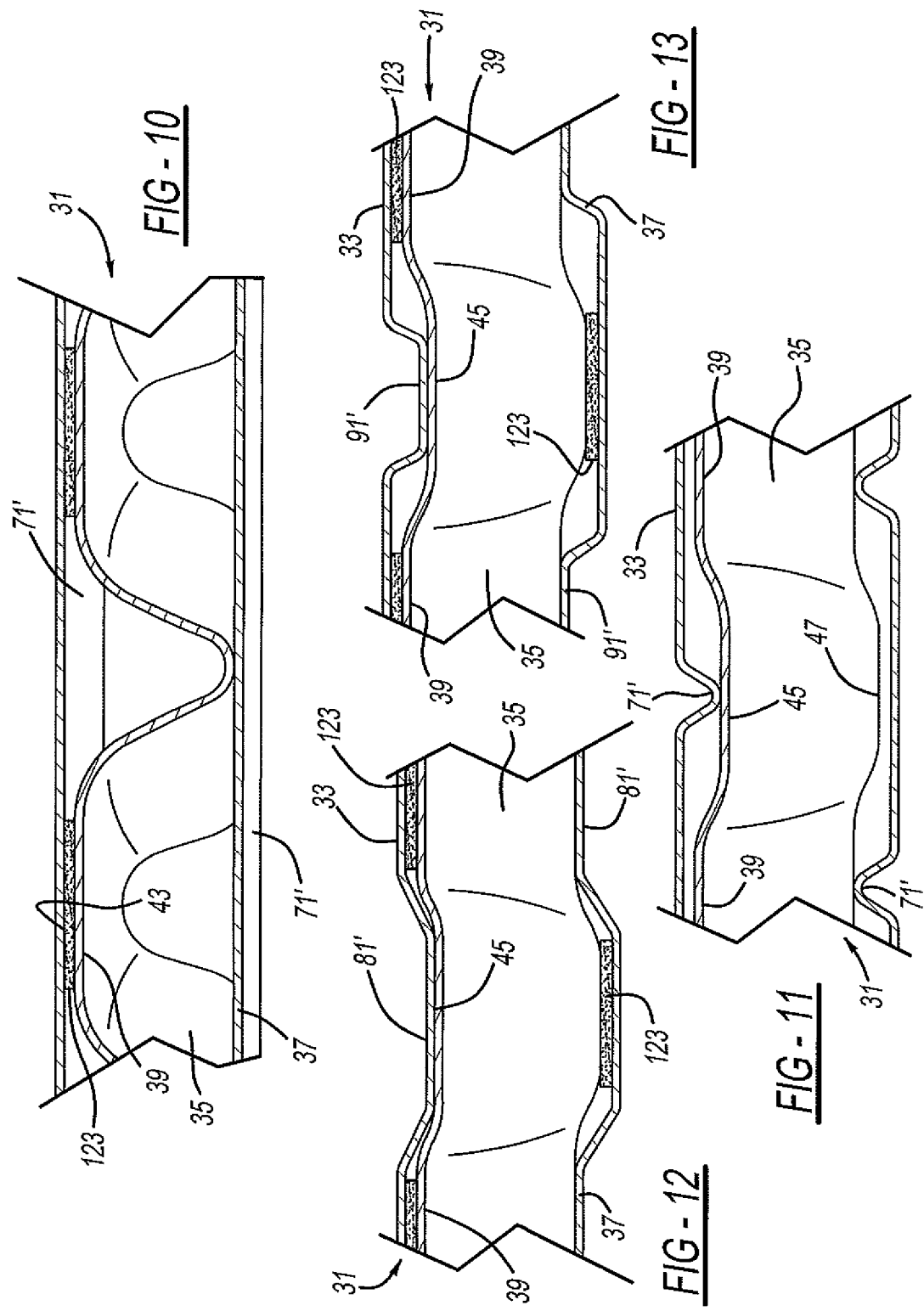

WHEELED TRAILER SANDWICH STRUCTURE INCLUDING GROOVED OUTER SHEET

CROSS-REFERENCE TO RELATED APPLICATIONS

This application is a continuation of U.S. patent application Ser. No. 15/303,958, filed on Oct. 13, 2016, which is a National Stage entry of PCT/US2015/026839, filed Apr. 21, 2015, which claims the benefit of U.S. Provisional Patent Application No. 61/982,453, filed Apr. 22, 2014, all of which are incorporated by reference herein.

BACKGROUND

The present invention relates generally to sandwich structures and more particularly to a sandwich structure including a core having alternating peaks and valleys, and one or more outer sheets including grooves.

Metallic sandwich structures having outer and core layers are known in the industry. For example, reference is made to the following U.S. Pat. No. 7,752,729 entitled "Method for Shaping a Metallic Flat Material, Method for the Manufacture of a Composite Material and Devices for Performing these Methods" which issued to Faehrrolfes et al. on Jul. 13, 2010; U.S. Pat. No. 7,648,058 entitled "Formed Metal Core Sandwich Structure and Method and System for Making Same" which issued to Straza on Jan. 19, 2010, and is commonly owned herewith; and U.S. Pat. No. 3,525,663 entitled "Anticlastic Cellular Core Structure having Biaxial Rectilinear Truss Patterns" which issued to Hale on Aug. 25, 1970; all of which are incorporated by reference herein. The Hale patent, however, teaches the use of vertically operable stamping dies to form nodes in a heated core sheet, with the objective of obtaining the same flexural and shear strength in all planes. A core stamped in this fashion is prone to tearing during node-forming and the node pattern is symmetrical. Furthermore, the Faehrrolfes patent disadvantageously requires a lubricant during its elongated wave shaping of the core to reducing tearing, which creates later problems with desired adhesive bonding of the outer sheets. It is also noteworthy that Faehrrolfes requires a complex mechanism in order to continuously adjust the forming roll positioning during shaping of each workpiece, which leads to tolerance accuracy concerns and rigidity inconsistencies within a single part as well as part-to-part. The Faehrrolfes wave pattern is also symmetrical in all directions. Additionally, the outer sheets in these patents are all flat after assembled to the core sheet.

SUMMARY

In accordance with the present invention, a sandwich structure employs a core sheet including alternating peaks and valleys therein, and at least one outer face sheet including grooves or ribs therein. In another aspect, a sandwich structure includes at least one metallic core and at least one adhesively bonded, metallic outer face sheet including elongated grooves or ribs formed therein. Yet another aspect of a sandwich structure has raised ridges bridging between adjacent peaks in a core sheet in one direction but not in a perpendicular direction, which synergistically interface, engage or contact with grooves or ribs formed in an outer face sheet. Another aspect employs at least three stacked cores in combination with one or more grooved sheets.

The present sandwich structure is advantageous over prior constructions. For example, the present sandwich structure advantageously does not require a lubricant or preheating on the core material for forming of the peaks and valleys therein, nor lubricant or preheating of the outer sheets for forming the grooves therein, thereby allowing an adhesive to be easily applied to the core without requiring removal of the undesired lubricant or an expensive adhesive formulation. Additionally, the present sandwich structure and method allow the peaks, valleys and grooves to be formed in the respective sheets in a very rapid, repeatable and low cost manner without the tearing concerns of the Hale and Faehrrolfes patents. Moreover, the present sandwich structure and method of manufacturing same are advantageously strong and resistant to thickness compression, and also advantageously exhibit improved shear stiffness, shear strength and length shrinkage factor properties. The interengaging or mating grooves or ribs of the outer sheets and peaks or valleys of the core sheet assist in alignment of the sheets during sandwich layup and during adhesive curing. Additionally, the grooves or ribs on the outer sheets are expected to reduce kinking failure by approximately 1.2-1.5 times, depending on the groove shape, as compared to flat outer sheets. Additional advantages and features of the present invention can be ascertained from the following description and appended claims, as well as in the accompanying drawings.

BRIEF DESCRIPTION OF THE FIGURES

FIG. 5 is a perspective view showing an outer sheet, having a first groove shape, employed in the sandwich structure;

FIG. 6 is a perspective view showing an outer sheet, having a second groove shape, employed in the sandwich structure;

FIG. 7 is a cross-sectional view, taken along line 4B-4B from FIG. 3, showing the first groove shape in the sandwich structure;

FIG. 8 is a cross-sectional view, taken along line 4B-4B from FIG. 3, showing the second groove shape in the sandwich structure;

FIG. 9 is a cross-sectional view; taken along line 4B-4B from FIG. 3, showing a third groove shape in the sandwich structure;

FIG. 10 is a cross-sectional view, taken along line 2-2 of FIG. 1, showing a contacting version of the sandwich structure;

FIG. 11 is a cross-sectional view showing the first groove shape in the contacting version of the sandwich structure;

FIG. 12 is a cross-sectional view showing the second groove shape in the contacting version of the sandwich structure;

FIG. 13 is a cross-sectional view showing the third groove shape in the contacting version of the sandwich structure;

DETAILED DESCRIPTION

Figure 1:
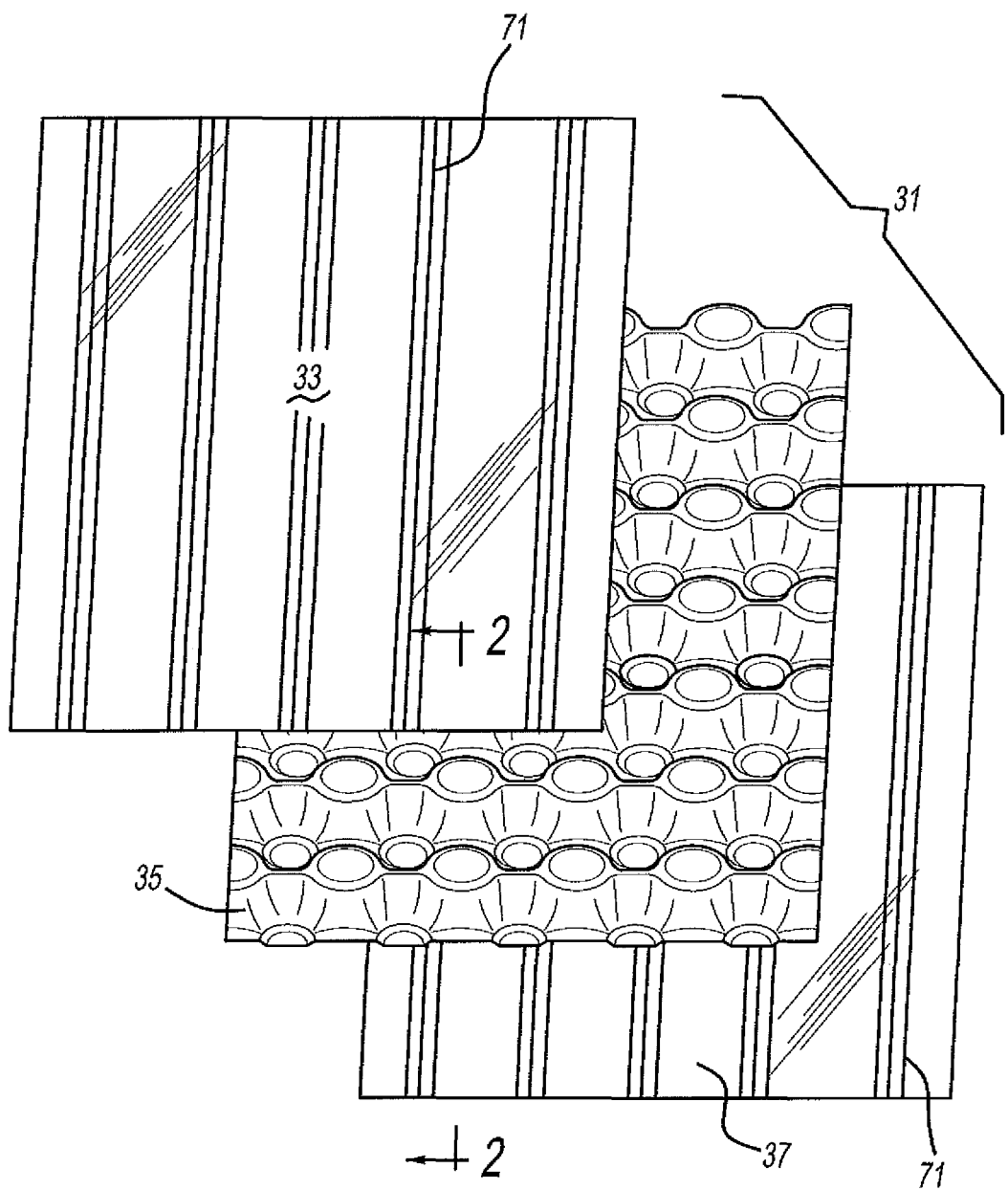
FIG. 1 is an exploded perspective view showing a sandwich structure.
Figure 2:
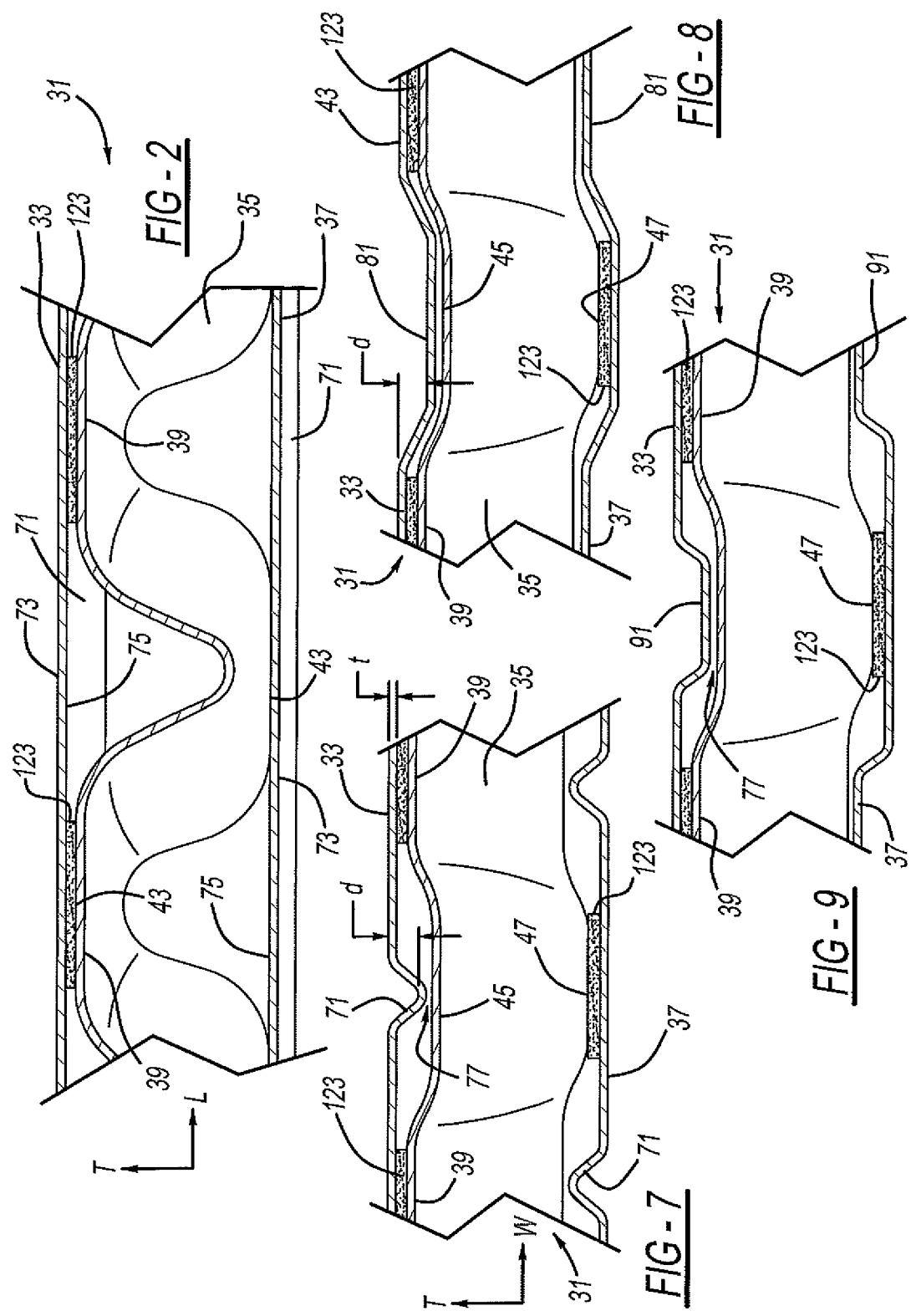
FIG. 2 is a cross-sectional view, taken along line 2-2 of FIG. 1, showing the sandwich structure.
Figures 3, 4A, 4B:
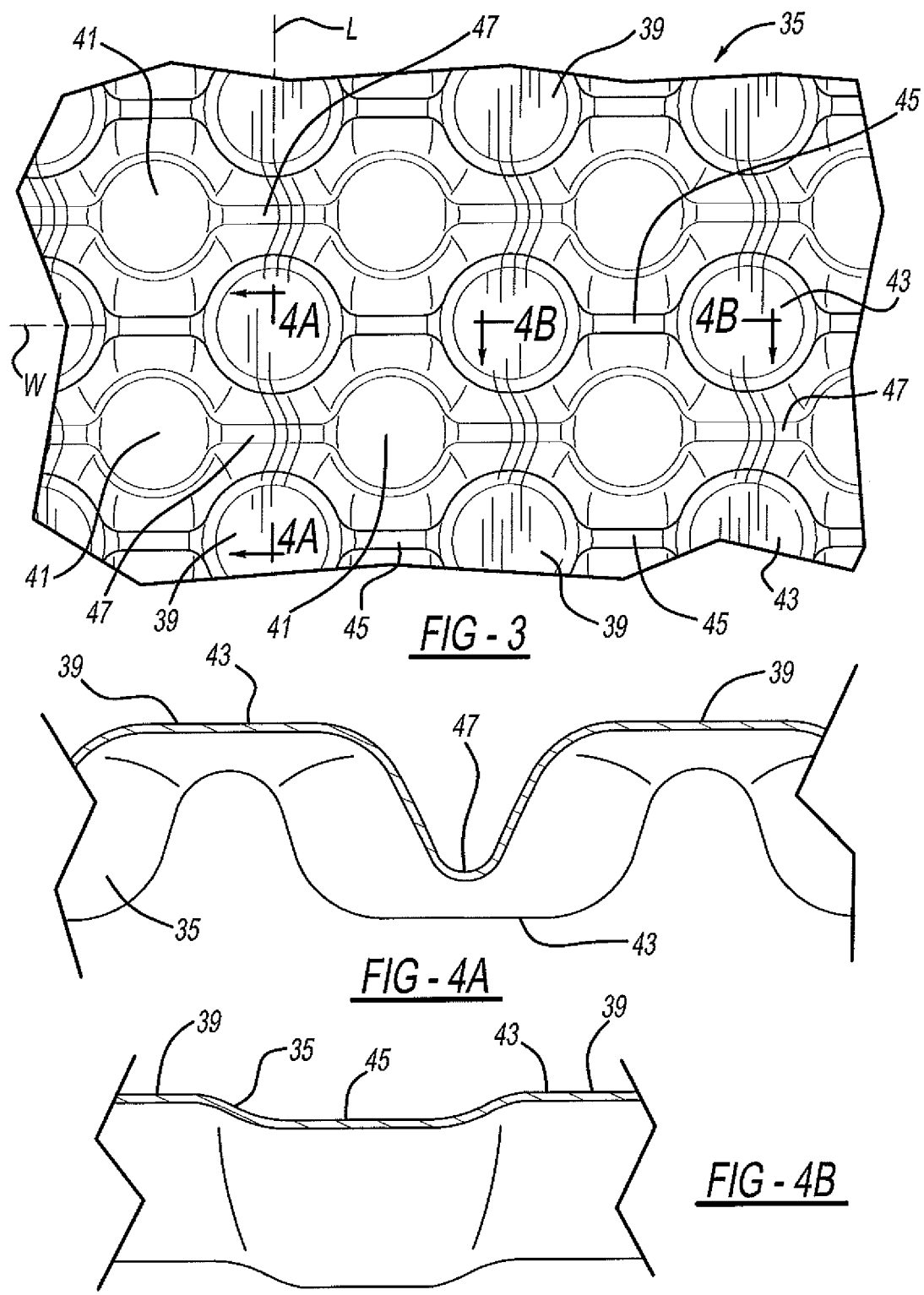
FIG. 3 is a true elevational view showing a formed core sheet employed in the sandwich structure.
FIG. 4A is a cross-sectional view, taken along line 4A-4A of FIG. 3, showing the core sheet.
FIG. 4B is a cross-sectional view, taken along line 4B-4B of FIG. 3, showing the core sheet.

A sandwich structure 31 can be observed in FIGS. 1-4B. Sandwich structure 31 includes a first outer face sheet 33, a middle core sheet 35 and an opposite second outer face sheet 37 secured together by an epoxy adhesive 123. Furthermore, core sheet 35 includes alternating peaks 39 and valleys 41, the external surface of each being defined by a generally flat land 43. Moreover, raised ridges 45 bridge or span between adjacent peaks 39 along a first width direction W but not in the perpendicular length direction L, where a more abrupt and steeply angled depression 47 is formed. Depressions 47 are located between adjacent peaks 39 along second direction L although each depression is elongated parallel to ridges 45 since the depressions are created on the back side of the ridges when the core sheet is formed into the desired contours from an initially flat workpiece sheet. Each ridge 45 is slightly lower than the generally flat lands 43 of the neighboring peaks 39. Sheets 33, 35 and 37 are preferably metallic, such as low carbon steel or aluminum, but any or all of these sheets may alternately be stainless steel or other metallic materials although many of the preferred manufacturing steps and final product properties may be different and less desirable. The metal grain structure is also different in the roll/feeding direction L of core sheet 35 than in the cross-roll/cross-feeding direction W.

The placement of ridges 45 and depressions 47 between the alternating peaks and valleys of core sheet 35 give the core sheet asymmetrical properties or characteristics after and during forming. For example, a length shrinkage factor fs, which is the initial core sheet length versus the formed end sheet length, is at least 1.08, and more preferably at least 1.10 in the roll direction L, as compared to a shrinkage factor fs of approximately 1.0 in the cross-roll/cross-feeding direction W. Furthermore, an out-of-plane shear stiffness of core sheet 35 is at least 1.3 times greater, and more preferably at least 1.4 times greater in the cross-roll/cross-feeding direction W, as compared to the roll/feeding direction L:

$$[L]-G_{WT}/G_{LT} \geq 1.3.$$

Additionally, an out-of-plane shear strength of core sheet 35 is at least 1.05 times greater, and more preferably at least 1.1 times greater in the cross-roll/cross-feeding direction W, as compared to the roll/feeding direction L:

$$[L]-\tau_{WT}/\tau_{LT} \geq 1.05.$$

Core sheet 35 is continuously fed along direction L into tensioning pinch rollers and then between a pair of embossing or forming rollers which rotate about their respective fixed axes. Multiple pins project from each embossing roller to form the peaks, valleys and ridges. Thereafter, the formed core sheet 35 is adhesively coated by coating rollers. Core sheet 35 is then manually or automatically stacked between the pre-cut outer layer sheets 33 and 37. The sandwiched sheets are subsequently fed into pre-heating oven, and the sandwich is then elevated in temperature while being laminated or compressed between laminating belts to cause sufficient bonding therebetween.

Referring to FIGS. 1, 2, 5 and 7, sandwich structure 31 employs outer face sheets 33 and 37 each of which has multiple linearly elongated grooves or ribs 71 which are preferably parallel to each other along length direction L. Generally flat and coplanar exterior and interior surfaces 73 and 75, respectively, of each outer face sheet are located between each adjacent pair of grooves 71 as a unitary and single piece sheet of metallic material. Each groove 71 of this version has a generally V-cross-sectional shape, with small radii located at transitions between the offset angled walls defining the groove. Each groove 71 has a depth d that is dimensioned between 1t and 5t, where t is the thickness of the associated outer face sheet 33 or 37. For example, each groove depth is preferably 0.4-2.0 mm and more preferably 0.4-1.0 mm. The distance S between adjacent grooves 71, along width or cross-roll direction W, is N times a node spacing (i.e., centerpoint-to-centerpoint) of the core layer peak pattern:

$$S_{GROOVE}=N*S_{NODE}.$$

The grooves on the lower (as illustrated) outer face sheet 37 are offset by half the node spacing in the W direction:

$$S_{NODE}/2.$$

The V-shaped grooves 71, as well as all other variations disclosed herein, are preferably manufactured in individually pre-cut sheets or continuously fed from a coiled metallic sheet by a forming step between a pair of adjacent die rollers prior to being adhesively bonded to the core.

As best illustrated in FIG. 7, each groove 71 of outer sheet 33 spans generally perpendicularly across multiple ridges 45 and between adjacent peaks 39 of core 35. Outer face sheet 37 has grooves 71 similarly aligned between opposite peaks and across ridges on the other side of core 35, thereby being offset along direction W from grooves 71 and upper face sheet 33. It is noteworthy that this configuration employs a gap or spacing 77 between ridges 45 and the interior surface of grooves 71 such that no contact is made therebetween. It is envisioned that ribs 71 and outer face sheets 33 and 37 reduce kinking failure of the fully assembled sandwich 31 by approximately 1.2-1.5 times versus using entirely flat outer face sheets without any such grooves or ribs. This is greatly advantageous when the sandwich structure supports loads thereupon or is needed to reduce denting or flexure thereof.

Another configuration of sandwich structure 31 is illustrated in FIGS. 6 and 8. In this embodiment, each outer face sheet 33 and 37 includes elongated grooves or ribs 81 each having a generally laterally widened U-cross-sectional shape defined by angular side walls 83 and a generally flat bottom wall 85 which is laterally greater than three times its depth d and more preferably at least five times its depth. Flat interior and exterior surfaces of each outer sheet connect between each groove 81 as with the prior embodiment. It is noteworthy that grooves 81 in this configuration are configured to generally matingly match and mirror the peak and ridge cross-sectional shapes and dimensions in a generally parallel manner, albeit the diagonal side walls 83 may have slightly different angles or curvatures than that of the transition between the adjacent ridges 45 to peaks 39. Gaps or spaces 77 are also present between grooves 81 and the adjacent interior ridges 45.

FIG. 9 shows another version of sandwich structure 31. Grooves or ribs 91 are of similar shape to those of FIG. 6, however, the present grooves 91 preferably have steeper side walls and the lateral width of their bottom walls is less than that of the prior embodiment. The rigidity and bending resistance of each groove 91 will thereby be somewhat different than that of groove 81. Gaps or spaces 77 are also present between grooves 91 and ridges 45.

Reference should now be made to FIGS. 10-13. In these embodiments, grooves or ribs 71', 81' and 91' are similar to those of the prior embodiments except that the bottom wall or surface of each groove directly or indirectly contacts against the adjacent ridge 45 spanning between peaks 39. If it directly contacts then there will be a sheet-to-sheet mating engagement. If there is indirect contact, however, an adhesive or structural foam layer may be present between the outer and core sheets. This contact advantageously increases compressive strength of the final assembled sandwich structure 31. Thus, with all of the embodiments disclosed herein, the grooves of the outer face sheets synergistically work with the patterned core sheet to enhance various load carrying, dent resistance and flexure resistance properties of the overall structure.

Figure 14:
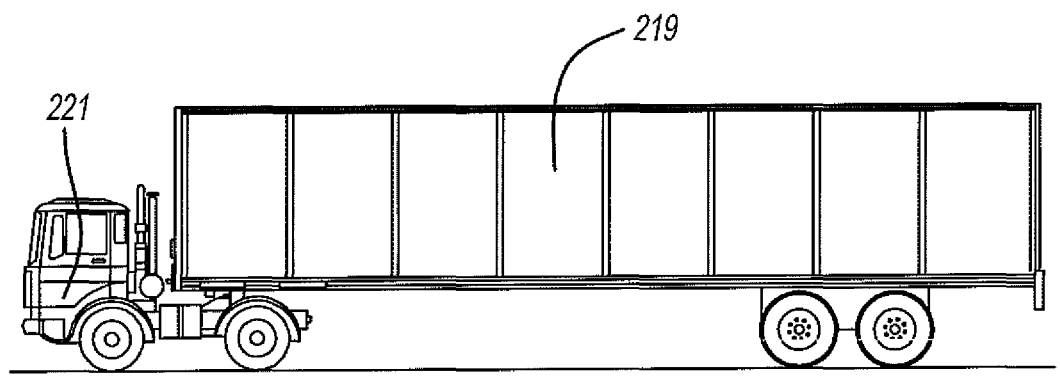
FIG. 14 is a side elevational view showing a truck and trailer employing the sandwich structure.
Figure 15:
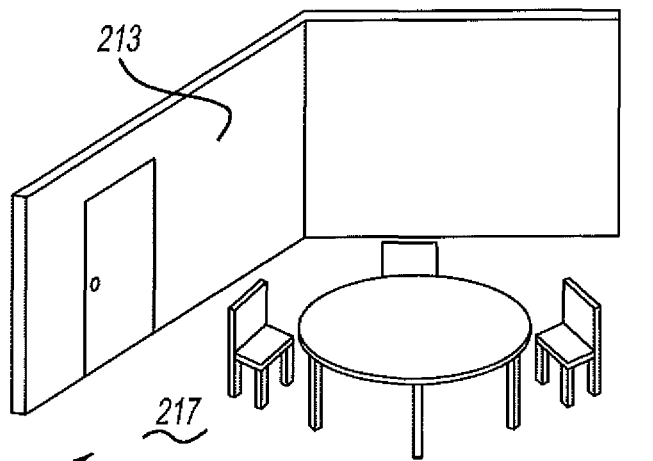
FIG. 15 is a perspective view showing a building wall and floor employing the sandwich structure.
Figure 16:
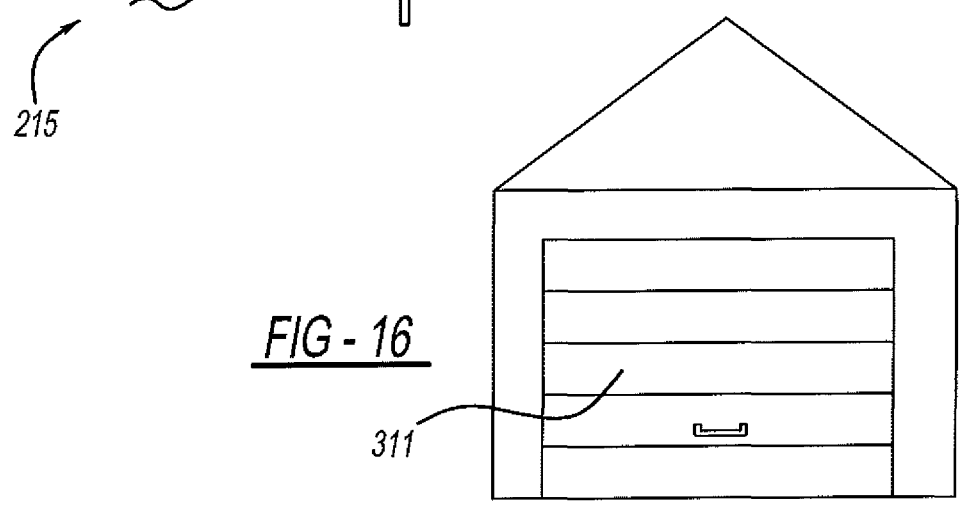
FIG. 16 is a true elevational view showing a movable garage door employing the sandwich structure.

FIG. 16 shows another variation wherein any of the previously disclosed sandwich constructions are employed as one or more sections of a door 311, such as a movable garage door with multiples of adjacent sandwich panels hinged together. The sandwich may alternately be a wall 213, ceiling, floor 217 or a smaller door of building 215 like that shown in FIG. 15. In another configuration, the sandwich structure constitutes a panel used as a wall, ceiling, floor or door for a wheeled trailer 219 pulled by a truck 221, railroad box car or a cargo-holding container, as illustrated in FIG. 14. Moreover, the sandwich structure can be used as a bed or floor, or interior side wall of an automotive vehicle such as a pickup truck box. It should also be appreciated that any of the preceding embodiments and features thereof can be mixed and matched with any of the others depending upon the final product and processing characteristics desired.

While various embodiments of the present invention have been disclosed, it should also be appreciated that other variations may be employed. For example, welding, spot welding or blind riveting may be used instead of adhesive bonding between the adjacent sheets, but many of the present weight, cost and quick assembly advantages may not be realized. Additionally, other dimensions and shapes may be provided for the core sheet features, outer sheet grooves and the like, however, many of the manufacturing advantages and property strengths will not be achieved. It is also envisioned that a single elongated groove or rib may be used for each outer face sheet, shortened length grooves or ribs can be employed and/or non-linear (e.g., arcuately elongated) grooves or ribs may be utilized, although some of the core interengaging, alignment and performance characteristics disclosed herein may not be obtained. Variations are not to be regarded as a departure from the present disclosure, and all such modifications are intended to be included within the scope and spirit of the present invention.

The invention claimed is:

1. A wheeled trailer sandwich structure comprising:
   outer metallic face sheets;
   a metallic core sheet including alternating peaks and valleys therein, the core sheet adhesively affixed between the outer face sheets to create a wheeled trailer wall or floor sandwich; and
   at least one of the outer face sheets comprising multiple parallel elongated grooves which each include a substantially flat bottom wall, a lateral width of which is greater than three times a depth of the bottom wall from a nominal surface of the associated outer face sheet.

2. The sandwich structure of claim 1, wherein the core sheet includes raised ridges bridging between adjacent of the peaks at one direction but not in the perpendicular direction, and the groove extends between peaks of the core sheet.

3. The sandwich structure of claim 1, wherein air gaps are present between the grooves and the peaks of the core sheet.

4. The sandwich structure of claim 1, wherein each of the grooves includes angular side walls between the nominal surface and the bottom wall, and the face sheets are flat between the grooves.

5. The sandwich structure of claim 1, further comprising at least one of: (a) an adhesive or (b) foam, is located against the groove.

6. The sandwich structure of claim 1, wherein each of the grooves have a substantially U-shaped cross-section.

7. The sandwich structure of claim 1, wherein a depth of each of the grooves is greater than a thickness of the associated face sheet, and the lateral width of the bottom wall is greater than five times the depth.

8. The sandwich structure of claim 1, wherein a depth of each of the grooves is between one and five times a thickness of an associated one of the outer face sheets, and a metal grain structure of at least one of the sheets is different in a feeding direction than in a cross-feeding direction.

9. The sandwich structure of claim 1, wherein a distance S between adjacent pairs of the grooves along a width direction W, is N times a node spacing of a peak pattern of the core sheet:

$$S_{GROOVE} = N * S_{NODE}.$$

10. The sandwich structure of claim 1, wherein there are at least three of the grooves parallel to each other in each of the outer sheets, and the peaks and valleys are embossed in the core sheet.

11. The sandwich structure of claim 1, wherein there are air gaps between the grooves and the core sheet, and an out-of-plane shear strength of the core sheet is at least 1.05 times greater in a first direction as compared to a perpendicular second direction.

12. The sandwich structure of claim 1, wherein the nominal surfaces of the face sheets are flat and parallel, and wherein the peaks include substantially circular lands.

13. The sandwich structure of claim 1, wherein the sandwich structure is a wall of a wheeled trailer pulled by a truck.

14. A wheeled trailer sandwich structure comprising:
   outer face sheets;
   a core sheet including alternating peaks and valleys therein, the core sheet affixed between the outer face sheets to create a wheeled trailer wall or floor sandwich;
   at least one of the outer face sheets including at least one elongated groove, with an air gap being located between the groove and the core sheet; and
   adhesive bonding the face sheets to the core sheet.

15. The sandwich structure of claim 14, wherein the at least one groove has a substantially U-shaped cross-section with a substantially flat bottom.

16. The sandwich structure of claim 15, wherein the bottom has a lateral width greater than three times its depth.

17. The sandwich structure of claim 14, wherein the at least one groove has a substantially V-shaped cross-section.

18. The sandwich structure of claim 14, wherein a depth of the groove is greater than a thickness of the associated one of the outer face sheets.

19. The sandwich structure of claim 14, wherein a distance S between adjacent pairs of the grooves along a width direction W, is N times a node spacing of a peak pattern of the core sheet:

$$S_{GROOVE} = N * S_{NODE}.$$

20. The sandwich structure of claim 14, wherein there are at least three of the grooves parallel to each other in the sandwich, and the peaks and valleys are embossed in the core sheet.

21. The sandwich structure of claim 14, wherein the sheets are metallic, and a metal grain structure of at least one of the sheets is different in one direction version a perpendicular second direction.

22. A wheeled trailer sandwich structure comprising:
outer metallic face sheets;
a metallic core sheet including alternating peaks and valleys therein, the core sheet affixed between the outer face sheets to create the wheeled trailer sandwich structure; and
a first of the outer face sheets including at least one elongated groove which inwardly projects toward a second of the outer face sheets, the groove including tapered sides spanned by a substantially flat bottom, the bottom having a lateral width at least three times greater than a depth.

23. The sandwich structure of claim 22, wherein the core sheet includes raised ridges bridging between adjacent of the peaks at one direction but not in the perpendicular direction, the ridges being thinner than the peaks, the peaks having a substantially circular top, and the peaks and valleys are embossed in the core sheet.

24. The sandwich structure of claim 22, wherein air gaps are present between the groove and the core sheet.

25. The sandwich structure of claim 24, wherein the sandwich structure is a wall of a wheeled trailer pulled by a truck.

26. The sandwich structure of claim 22, wherein there are at least three of the grooves parallel to each other in the associated outer sheet which is flat between the grooves.

27. The sandwich structure of claim 26, wherein the sandwich structure is a wall of a wheeled trailer pulled by a truck.

28. The sandwich structure of claim 22, wherein there are air gaps between the grooves and the core sheet, and an out-of-plane shear strength of the core sheet is at least 1.05 times greater in a first direction as compared to a perpendicular second direction.

29. The sandwich structure of claim 22, wherein:
the peaks of the core sheet are substantially circular in a true view; and
a metal grain structure of the core sheet is different in one direction versus a perpendicular direction.

30. The sandwich structure of claim 22, further comprising adhesive affixing the outer face sheets to the core sheet.

* * * * *